United States Patent [19]
Ferbeck et al.

[11] Patent Number: 6,161,484
[45] Date of Patent: Dec. 19, 2000

[54] TRANSPORT INSTALLATION WITH OPTICAL AND MECHANICAL GUIDING

[75] Inventors: Daniel Ferbeck, Issy-les-Moulineaux; Michel Rebuffet, Rueil-Malmaison, both of France

[73] Assignees: Matra Transport International, Paris; Matra Systemes et Information, Velizy-Villacoublay, both of France

[21] Appl. No.: 09/194,709

[22] PCT Filed: Apr. 15, 1998

[86] PCT No.: PCT/FR98/00758

§ 371 Date: Mar. 19, 1999

§ 102(e) Date: Mar. 19, 1999

[87] PCT Pub. No.: WO98/47754

PCT Pub. Date: Oct. 29, 1998

[30] Foreign Application Priority Data

Apr. 18, 1997 [FR] France .................................. 97 04839

[51] Int. Cl.[7] ..................................................... B61B 12/00
[52] U.S. Cl. ............................................ 104/243; 104/247
[58] Field of Search ..................................... 104/242, 243, 104/244.1, 245, 247; 105/72.2, 215.1, 215.2; 180/168

[56] References Cited

U.S. PATENT DOCUMENTS

| | | | |
|---|---|---|---|
| 4,700,302 | 10/1987 | Arakawa et al. ........................ | 180/168 |
| 4,908,557 | 3/1990 | Sudare et al. ........................... | 180/168 |
| 5,081,585 | 1/1992 | Kurami et al. .......................... | 180/168 |
| 5,115,746 | 5/1992 | Scarpatetti .............................. | 104/245 |
| 5,208,750 | 5/1993 | Kurami et al. .......................... | 180/168 |
| 5,318,143 | 6/1994 | Parker et al. ............................ | 180/168 |
| 5,347,456 | 9/1994 | Zhang et al. ............................ | 180/168 |
| 5,485,378 | 1/1996 | Franke et al. . | |

FOREIGN PATENT DOCUMENTS

| | | |
|---|---|---|
| 0527665 | 2/1993 | European Pat. Off. . |
| 4002113 | 4/1991 | Germany . |
| 4407726 | 3/1995 | Germany . |

*Primary Examiner*—Mark T. Le
*Attorney, Agent, or Firm*—Nath & Associates PLLC; Gary M. Nath

[57] ABSTRACT

The installation comprises a roadway having at least some segments provided with longitudinal reference marking (10) for a nominal path, and vehicles (18) each carrying an assembly providing guidance by controlling a steering axle, having a module for forming an image of the road ahead of the vehicle (18) and for processing the image of the marking, and an optical guidance module calculating the orientation to be given to the wheels of the steering axle to follow the nominal path, and a steering servo-motor controlled by the guidance module. At at least certain segments of the road carry lateral guides (14, 16) and the vehicles, whose front axles at least are steering axles, are provided on each axle with vertical-axis guide wheels (24) designed to press against the guides (14, 16) in the event of the vehicle departing excessively from a nominal path on the road.

10 Claims, 3 Drawing Sheets

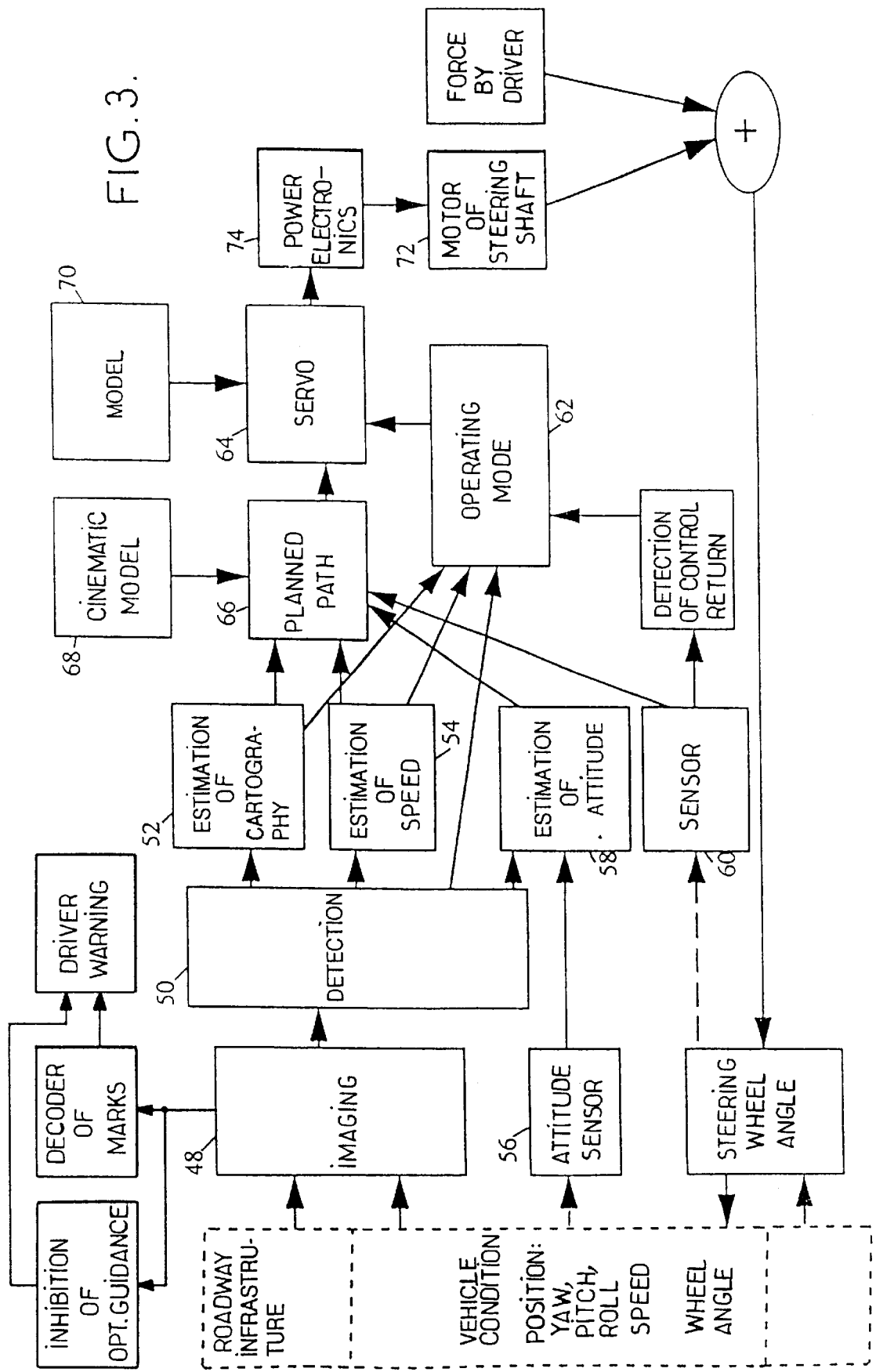

TRANSPORT INSTALLATION WITH OPTICAL AND MECHANICAL GUIDING

BACKGROUND OF THE INVENTION

The present invention relates to public transport installations using a track that is specific or "dedicated" to the installation, which comprises a roadway and vehicles on pneumatic tires, with at least the front axle of a vehicle serving for steering or guidance. An important application of the invention lies in urban and sub-urban areas for carrying volumes of traffic that are smaller than those which would justify transport units of great length.

Such installations are already known which are guided optically, and in which the road carries, at least on certain segments thereof, longitudinal marking constituting a reference for the nominal path to be followed by a vehicle, and each vehicle carries an assembly for guiding the vehicle by controlling its steering axle, which assembly includes a module for forming an image of the road ahead of the vehicle and for making use of the marking, and an optical guidance module which steers the wheels of the steering axle. The servomotor for applying steering force to the wheels is generally an electric torque motor so as to enable the driver to override optical guidance when necessary. However such optical guidance does not absolutely guarantee the necessary levels of accuracy and safety, particularly at high speed.

SUMMARY OF THE INVENTION

The present invention seeks in particular to provide a public transport installation of the kind defined above that makes it possible to reduce the ground area occupied by its road, where that is useful, to guarantee clearances when optical guidance becomes insufficient, and to improve vehicle safety. To this end, the invention proposes an installation in which certain segments of the roadway are provided with at least one lateral guide, and the vehicles are provided, at least on the steering axle, for vertical-axis guide wheels that engage the lateral guide if the vehicle departs excessively from a nominal path on the road.

One or more lateral guides can be provided whenever it is essential to reduce the amount of land required for the road, and in particular at high speed. The road may also be defined merely by elements on the ground, such as speed reducer or vibration strips.

Longitudinal marking will generally be provided in the land area over which the vehicle travels. It can be provided in particular: in station approaches, such that the guidance reduces the gap between the platform (which can also constitute a guide) and the deck of the vehicle; wherever precision guidance is important, such as pole-engagement zones when electricity is provided by two catenaries and a pole; and on approaching zones that have lateral guides in order to avoid striking the guides, and then in order to travel between them.

By means of the optical guidance, contact between the guide wheels and the lateral guides can be caused to be exceptional under normal operating conditions, apart from in zones where the road follows a bend of small radius and in zones where the lateral guides are brought close together so as to further reduce the amount of land occupied by the road. In such zones, optical guidance can be disabled. This can be achieved by putting markings on the road indicating that optical guidance is coming to an end or is about to start, with such markings being identifiable by the image processing module.

Apart from zones of small radius of curvature or of close guidance, the guide wheels will make contact with the guides only exceptionally, thereby reducing wear on the running equipment. Nevertheless, the guide improves safety wherever it is provided, particularly in the event of an accident, such as a tire being punctured or in the event of emergency braking that might cause skidding.

Marks additional to those constituting the reference may be provided on the roadway, carrying information relating to the longitudinal travel of the vehicle. These marks are decoded and communicated to the driver by audible or visual means or by any other device for transmitting information.

The above characteristics and others appear more clearly on reading the following description of a particular embodiment, given as a non-limiting example. The description refers to the accompanying drawings:

BRIEF DESCRIPTION OF THE DRAWINGS

FIG. 3 is a block diagram showing the various functions of the guidance system and the parameters involved in implementing it.

DETAILED DESCRIPTION

A transport installation according to the invention has a roadway that is dedicated specifically for the installation, at least in certain zones. One of the advantages of the invention is that it enables the vehicle to travel over zones that are not controlled, i.e. solely under the control of a driver. In such portions of a network, no road equipment is required other than optional protection in the form of vibration roads or studs.

Over the major portion of the road, it is provided with a reference mark on the ground, generally on the axis of the nominal path to be followed by the vehicle. In the example shown in FIG. 1, the reference mark is constituted by two parallel lines 10 that are interrupted at regular intervals selected so as to avoid confusion with ordinary road marking. Other types of marking could be envisaged, including the use of reflecting marks, in which case it would be necessary for the vehicle to carry lighting therefor. The reference marks are interrupted in zones where optical guidance is not required or is not possible. As a general rule, gaps in optical guidance and returns to optical guidance are indicated by marks on the ground, such as the mark referenced 12 in FIG. 1.

Zones in which mechanical guidance is provided generally comprise two lateral guides 14 and 16. Exceptionally, a single lateral guide 14 or 16 may be provided locally. The guide can be constituted by a low fence that is about 20 centimeters high. In stations, it can be constituted by the station platform itself. To 10 provide satisfactory guidance, guide positioning tolerance is about 1 cm, and road banking or camber should be small.

Figure 1:
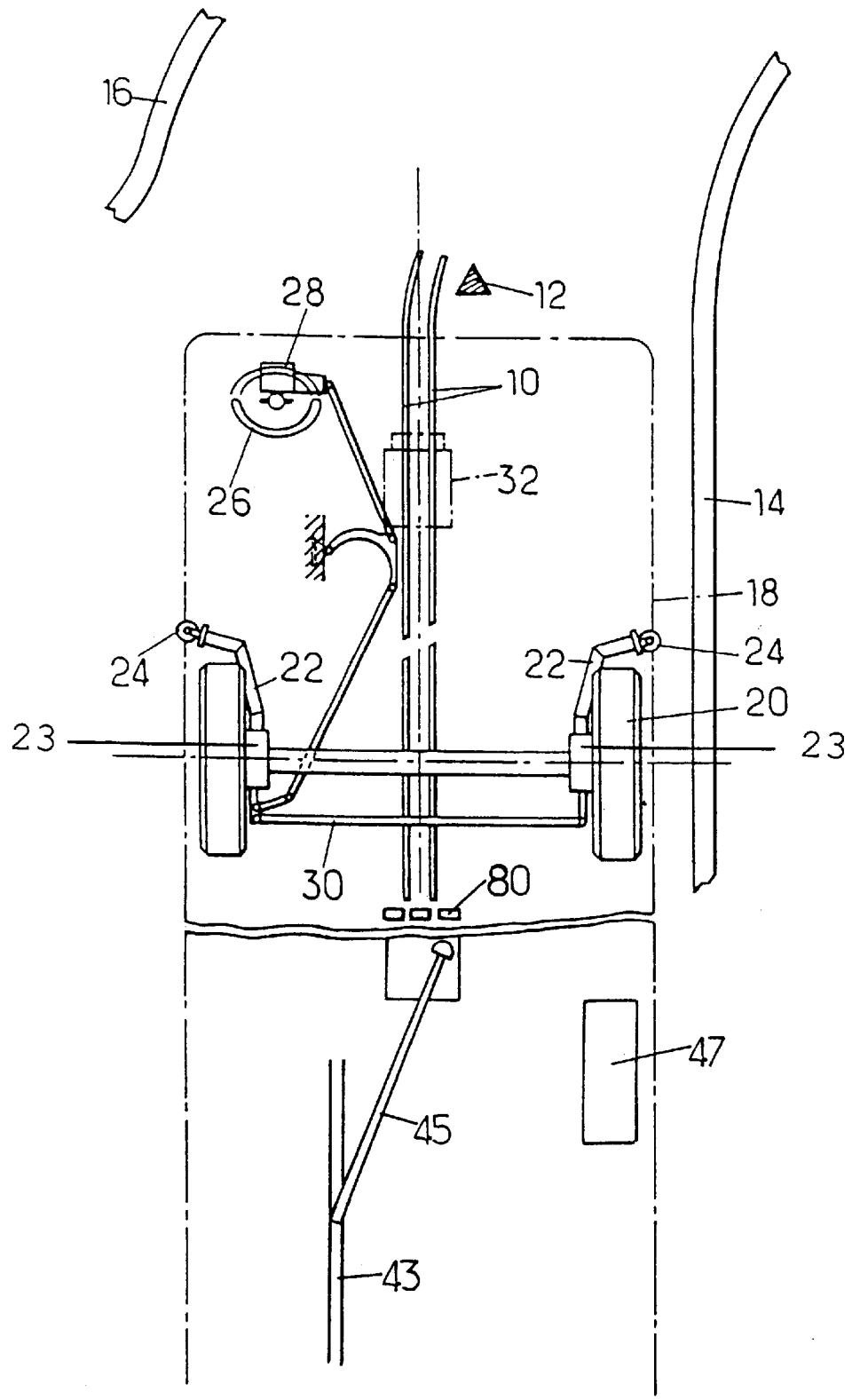
FIG. 1 is a diagrammatic plan view for showing up the structure of a fraction of the roadway and also the guide elements carried by the vehicle.

Vehicles 18 designed to travel on the road are generally similar in structure to a trolley bus. The lack of metal rails makes a trolley-type disposition desirable so as to avoid any need to install return conductors in the ground. The vehicles may be of standard type or they may be articulated, and for reasons of simplicity it is preferably for them to have only one steering axle. FIG. 1 shows such a front steering axle, carrying wheels fitted with pneumatic tires 20. Each of the steering swivels of the front axle is provided with a feeler arm 22 carrying a guide wheel 24 that is rotatable about a vertical axis. The feeler arms ensure forced steering of the front wheels whenever they come into contact with a guide.

The means for guiding the vehicle manually may be conventional, comprising a steering wheel 26 controlling a steering servo-unit 28 connected by a linkage to the steering swivel of one of the wheels. A coupling bar 30 ensures that both wheels steer simultaneously.

The vehicle also carries at least one camera 32 looking at the ground in front of the vehicle and providing an image of the reference mark. This camera must have an angular field of view that is large enough to provide information even on a curve, at least while the radius of the curve is compatible with optical guidance.

When the radius of curvature is smaller than a limit value, optical guidance can be disabled. Optical guidance can also be disabled at particular locations along the road.

In particular zones, for example zones where clearance is particularly small, two guides 14 and 16 are provided that are spaced apart by a distance that is slightly smaller than the spacing between the guide wheels 24 (which are then prestressed). Under such circumstances, the guide wheels are in permanent contact with the guides and optical guidance can be disabled. Optical guidance can be disabled as a result of detecting a mark 12 on the ground.

To accommodate these various modes of operation, the guide wheels mounted on the feeler arms are generally provided on all of the axles so as to keep the wheels away from the guides.

It can be considered that the installation is designed to have three main modes of operation, depending on the location of the vehicle along the road:
  manual driving in portions of the path followed where there are no guides and no reference marks;
  optical guidance when the reference mark is present, and providing the radius of curvature of the road does not cross a limit value; and
  guidance provided by mechanical thrust between the guide wheels and one or both of the guides in narrow zones or in tightly curved zones.

The vehicle is designed to enable the driver to act on the steering wheel so as to depart from the reference given by the optical guide means, for example in the event of the driver observing drift due to some incident or in the event of the driver seeking to depart from the nominal path in portions of the road that are not dedicated. Guidance provided by mechanical thrust takes priority over the other two forms of guidance.

Under all circumstances, the driver remains in control of starting, accelerating, maneuvering in zones where the vehicle is turned around, braking, and stopping. Nevertheless, speed regulation may be provided.

Optical guidance is provided not only in locations where there is no mechanical guide, but also when pulling into a station platform, where the platform itself constitutes a near-side guide. Pulling out from a station may also be performed under optical guidance.

Guidance provided by mechanical thrust is always provided in the final stages of pulling into a station and in portions that are narrow or that are sharply curved, with thrust being applied by one guide only or by two guides.

Figure 2:
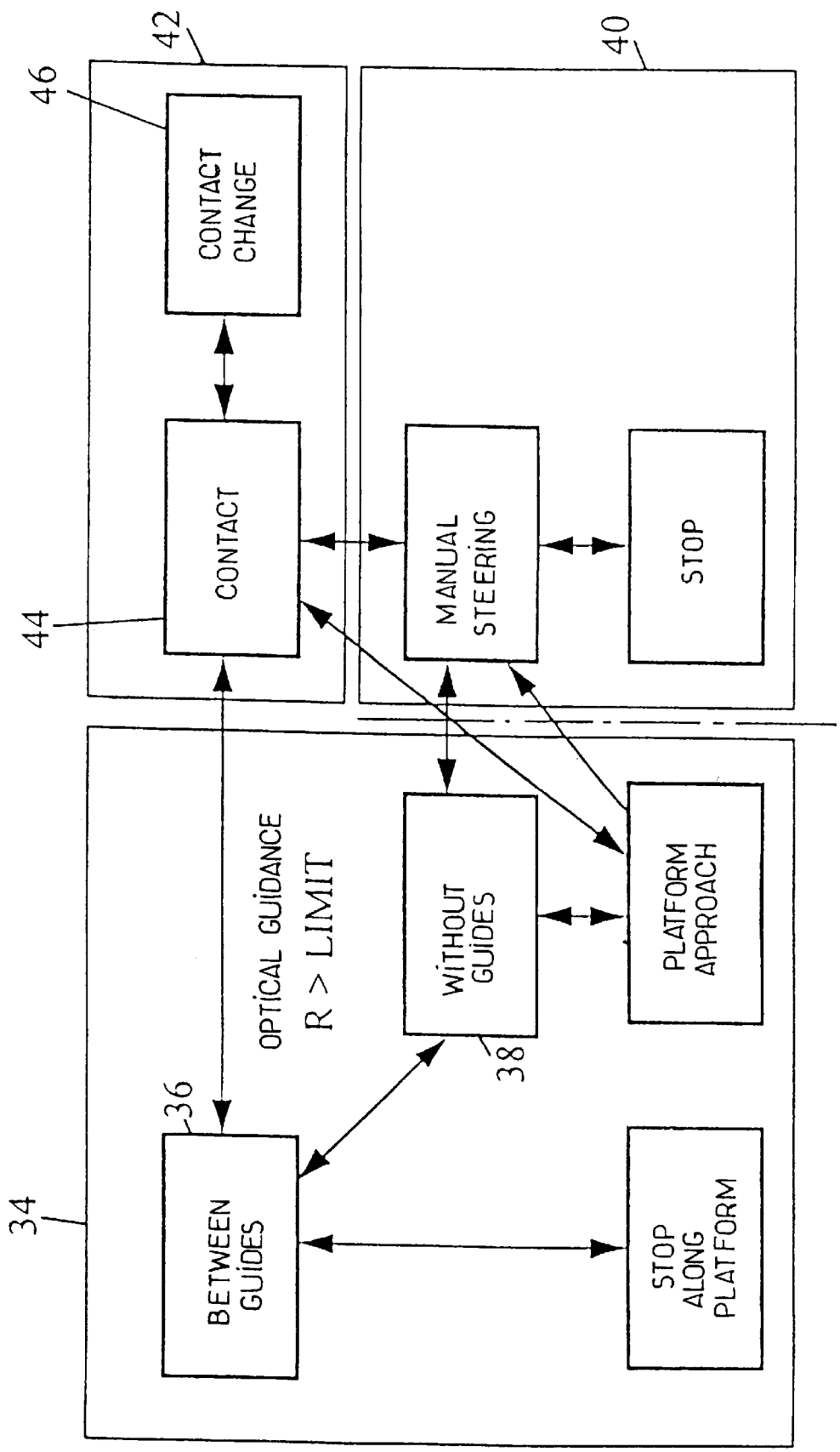
FIG. 2 is a block diagram showing different operating modes and transitions between them.

Transitions between different modes of guidance are shown diagrammatically in FIG. 2. Optical guidance mode 34 can exist equally well between guides, as shown at 36 and without any guide, as shown at 38. The maneuver of pulling into a station platform can be used with thrust against a single guide. Stopping will generally take place between two guides.

Manual driving, shown at 40, without a guide and without optical guidance, takes place in all zones that are not fitted with equipment. Such unconstrained driving also includes stopping the vehicle solely under driver control.

During mechanical guidance 42, thrust can be against one guide only, as shown at 44, or with thrust changing over from one guide to another, as shown at 46, particularly when performing successive turns in opposite directions.

Transitional states occur on detecting the beginning or the end of the reference mark for optical guidance, on penetrating between guides, and on returning control to the driver with optical guidance being inhibited, in the absence of a guide or at low speed.

In general, the vehicles are propelled by an electric motor 23 on each axle or each wheel, thereby making it possible to reduce deck level considerably.

The overhead electricity line 43 may be interrupted at various locations, for example at garage accesses or where lines cross. Under such circumstances, the vehicle must have an independent energy supply, for example an alternator driven by an engine or a storage battery 47 of sufficient capacity. Because of the optical guidance, reengaging the pole 45 after a gap in the electrical power supply line can be greatly facilitated.

It is also possible to use vehicles that operate continuously under their own power supply, such as an engine driving an alternator, but as a general rule that solution will not be used because it generates pollution.

An overall view of the way the installation operates can be as shown diagrammatically in FIG. 3 by way of example. Image forming apparatus 48 includes a camera 32 and means enabling the image to be corrected to compensate for the attitude of the vehicle. By way of example, the camera could be a CCD camera enabling an image of the road to be formed concerning the zone of the road situated in front of the vehicle and extending up to 30 meters to 50 meters ahead. A wide field, generally greater than 60°, will generally be necessary in order to accommodate curves ahead of the vehicle.

The camera can be provided with a polarizing filter to reduce specular reflections from the road.

The road may have reference marks implemented in the form of studs that are merely reflective. Under such circumstances they must be illuminated from the vehicle.

This illumination can be performed in the visible or in the near infrared by pulses that are synchronized with the opening of the camera shutter. Under such circumstances, exposure can be of short duration, less than 100 $\mu$sec, and the camera can be provided with a narrowband filter centered on the illumination wavelength, which may be provided by a laser diode. If instead of using pale strips 10, light-emitting studs are used that emit over a narrow waveband, then the camera can be provided with a narrow optical filter centered on the emission wavelength.

The reference marks are identified by a circuit 50 and the path is delivered in digital form to circuits 52 for estimating layout of the marking on the ground (including horizontal and vertical curves), and circuits 54 for estimating the speed of the vehicle. Successive speed estimates also enable acceleration to be calculated. Variations in the angle of the ground marking enable transverse speed to be calculated. A trim sensor 56 provides a signal enabling an additional circuit 58 to estimate the position of the vehicle in terms of yaw, pitch, and roll, on the basis of information supplied by the detector circuit 50. The trim sensor can be constituted by a tilt sensor located between the suspended and the non-suspended portions of the vehicle.

Finally, the position of the steering wheel is measured by a sensor 60. Analyzing variations in the angle measured thereby also makes it possible to detect when the driver is taking over, because of the difference between a reference angle and the actual angle.

The servo-control loop 64 uses a model 70 of the steering shaft motor 72 and of steering dynamics and the planned path as delivered by the circuit 66 to control the power electronics 74 which actuate the torque motor 72 of the steering shaft.

The servo-control loop may be of a conventional type, seeking to cause a determined point of the vehicle e.g. a point situated between its axles to follow the ground marking. This servo-control takes account of the difference between the reference position and the current state of the vehicle, i.e. its position and its attitude, and can also take account of speed and acceleration.

The servo-control loop 64 must operate at a frequency that is no greater than the frequency at which the shape of the road is estimated on the basis of successive images supplied by the system 48 and the frequency at which the state parameters of the vehicle are estimated.

The steering shaft receives both the torque exerted by the steering column motor, and the torque exerted by the driver on the steering wheel; these torques are added together. In stations where the driver must be capable of taking control of vehicle steering, the maximum torque applied by the motor 72 must be smaller than that which a normal driver is capable of applying.

The device may also have means for triggering a visual or audible alarm in the event of a speed limit being exceeded that depends on the type of guidance: marks 80 can be placed beside the reference mark to specify speed limits; when the speed limits are exceeded, onboard circuits can also generate an alarm.

Although the term "circuit" is used in the description above, it must be understood that many of the functions described are implemented in practice by software means, using one or more processors and/or computers. When a computer is used, it may be a multitasking computer and it may perform other functions as well.

The sensor also makes it possible to measure the speed of rotation of the steering column and to make use of non-proportional servo-control downstream therefrom.

On the basis of information provided by the components 50, 52, 54, and 60, the actual mode of operation can be determined by a circuit 62 which determines whether or not the servo-control circuit 64 needs to intervene. Servo-control should seek to constrain the vehicle to follow a determined path as established by a circuit 66 on the basis of the information it receives from the circuits 52, 54, 58, and 60, and on the basis of a simple dynamic model 68 of the vehicle.

What is claimed is:

1. A public transport installation comprising:

a roadway at least some segments of which are provided with longitudinal reference marking indicating a nominal path; and a plurality of vehicles, each carrying a guidance assembly, that operates by controlling wheels of at least a front steering axle of the vehicle, said guidance assembly including a module for forming an image of the roadway ahead of the vehicle and for processing the image of the reference marking, a guidance module for calculating an angle to be given to the wheels of the steering axle to cause the nominal path to be followed, and a steering servo-motor controlled by the guidance module, wherein at least certain segments of the road carry lateral guides, and the vehicles are provided on each steering axle with guide wheels steerable about a vertical axis and arranged to press against the guides in the event of the vehicle departing from a nominal path on the roadway by more than a predetermined amount.

2. A transport installation according to claim 1, characterized in that the vehicle has one electric motor per axle or per wheel, which motor is powered by an electricity source.

3. An installation according to claim 2, wherein the electricity sources includes a main overhead power line and each of said vehicles has at least a pole for connection with said line and an on-board independent source.

4. An installation according to claim 3, characterized in that additional marks are provided on the roadway to indicate a beginning of each zone in which the guidance module can be used.

5. An installation according to claim 1 wherein the guide wheels provided or the front steering axle are mounted on arms for imparting forced steering to the wheels of said front axle.

6. An installation according to claim 1, wherein each said vehicle further includes a manual steering wheel that acts in addition to an action of the guidance module.

7. An installation according to claim 1, wherein said reference marking is provided at least in approaches to stations.

8. An installation according to claim 7, wherein additional marking is provided on the roadway bearing information relating to longitudinal displacement of the vehicle, and the vehicles are provided with means for decoding the information and for informing the driver by means for transmitting information.

9. An installation according to claim 1, further comprising means for disabling optical guidance if a radius of curvature of the roadway is detected that is smaller than a predetermined threshold.

10. An installation according to claim 1, wherein the reference marking is constituted by a pattern constituted by repeated parallel patterns.

* * * * *